US012205459B2

(12) United States Patent
Maguire et al.

(10) Patent No.: US 12,205,459 B2
(45) Date of Patent: Jan. 21, 2025

(54) SYSTEMS AND METHODS FOR HUMAN-MEMORY IMPRINTING OF VISUAL INDICATOR WITH BLINK PATTERN

(71) Applicant: Dell Products L.P., Round Rock, TX (US)

(72) Inventors: Amrita Sidhu Maguire, Cedar Park, TX (US); Matthew B. Gilbert, Austin, TX (US); Kevin W. Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 17/978,584

(22) Filed: Nov. 1, 2022

(65) Prior Publication Data

US 2024/0144791 A1 May 2, 2024

(51) Int. Cl.
*G08B 5/38* (2006.01)
*G08B 21/18* (2006.01)

(52) U.S. Cl.
CPC ............... *G08B 5/38* (2013.01); *G08B 21/18* (2013.01)

(58) Field of Classification Search
CPC .................................. G08B 5/38; G08B 21/18
See application file for complete search history.

(56) References Cited

U.S. PATENT DOCUMENTS

2011/0080292 A1* 4/2011 Tomoda .................. G08B 7/00 340/815.4
2021/0384979 A1* 12/2021 Dahlfort ............. H04B 10/116

* cited by examiner

*Primary Examiner* — Brian Wilson
(74) *Attorney, Agent, or Firm* — Jackson Walker L.L.P.

(57) ABSTRACT

A method may include, in response to a condition related to a particular device of a plurality of devices in an information handling system, causing a particular visual indicator associated with the particular device to illuminate in accordance with a blink pattern. The blink pattern may include one or more first durations of time in which the particular visual indicator is illuminated, one or more second durations of time significantly shorter than the first durations of time in which the particular visual indicator is illuminated, and a plurality of third durations of time significantly shorter than the first durations of time and the second durations of time in which the particular visual indicator is darkened, wherein each first duration of time occurs immediately before and after a third duration of time and each second duration of time occurs immediately before and after a third duration of time.

24 Claims, 4 Drawing Sheets

SYSTEMS AND METHODS FOR HUMAN-MEMORY IMPRINTING OF VISUAL INDICATOR WITH BLINK PATTERN

TECHNICAL FIELD

The present disclosure relates in general to information handling systems, and more particularly to systems and methods for providing particular blink patterns for visual indicators in order to more efficiently communicate to a human a condition associated with an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems and components thereof may include one or more visual indicators (e.g., light-emitting diode, liquid crystal display, other source of light, or other visually-perceptible mechanism) for communicating information (e.g., status, alert, warning, etc.) regarding the information handling systems or a component thereof. Despite the utility of such visual indicators, some information handling systems (and data centers having multiple information handling systems) may have a large plurality of different indicators on the outside thereof, meaning that communication to a human (e.g., a user or administrator of the information handling system) of a particular condition via a visual indicator (e.g., static white or slow blinking visual indicator) may be drowned out by the visual "sea" of other visual indicators (e.g., other static or blinking visual indicators in blue, green, amber, and/or other colors). This may be troublesome if the particular condition is a critical condition.

For example, in certain instances, removal of a storage resource (e.g., disk drive) during data caching, power vaulting, another operation that requires active reading and writing from the storage resource, or other operations, may result in irretrievable data loss. However, users/technicians are often accustomed to externally-accessible storage resources being hot-swappable, and multiple hot-swap drives in close proximity may be more susceptible to removal via inadvertent actions (e.g., accidental release of a latch that mechanically maintains the storage resource within the information handling system). To reduce the likelihood of removal during such conditions, the storage resource may have a visual indicator that may illuminate to indicate a presence of such condition, in order to warn the user/technician of the condition so that the user/technician is warned against removal of the storage resource. However, if the user/technician fails to visually register such illumination of the visual indicator, the user/technician may fail to heed the warning, and accidentally remove the storage resource.

SUMMARY

In accordance with the teachings of the present disclosure, the disadvantages and problems associated with existing approaches to providing visual alerts associated with an information handling system may be reduced or eliminated.

In accordance with embodiments of the present disclosure, an information handling system may include a processor, a plurality of devices communicatively coupled to the processor, a plurality of visual indicators, each visual indicator associated with a respective device of the plurality of devices, and a management controller communicatively coupled to the plurality of visual indicators and configured to, in response to a condition related to a particular device of the plurality of devices, cause a particular visual indicator associated with the particular device to illuminate in accordance with a blink pattern. The blink pattern may include one or more first durations of time in which the particular visual indicator is illuminated, one or more second durations of time significantly shorter than the first durations of time in which the particular visual indicator is illuminated, and a plurality of third durations of time significantly shorter than the first durations of time and the second durations of time in which the particular visual indicator is darkened, wherein each first duration of time occurs immediately before and after a third duration of time and each second duration of time occurs immediately before and after a third duration of time.

In accordance with these and other embodiments of the present disclosure, a method may include, in response to a condition related to a particular device of a plurality of devices in an information handling system, causing a particular visual indicator associated with the particular device to illuminate in accordance with a blink pattern. The blink pattern may include one or more first durations of time in which the particular visual indicator is illuminated, one or more second durations of time significantly shorter than the first durations of time in which the particular visual indicator is illuminated, and a plurality of third durations of time significantly shorter than the first durations of time and the second durations of time in which the particular visual indicator is darkened, wherein each first duration of time occurs immediately before and after a third duration of time and each second duration of time occurs immediately before and after a third duration of time.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in response to a condition related to a particular device of a plurality of devices in an information handling system, cause a particular visual indicator associated with the particular device to illuminate in accordance with a blink pattern. The blink pattern may include one or more first durations of time in which the particular visual indicator is illuminated, one or more second durations of time significantly shorter than the first durations of time in which the particular visual indicator is illuminated, and a plurality of third durations of time significantly shorter than the first durations of time and the second durations of time in which the particular visual indicator is darkened, wherein each first duration of time occurs immediately before and after a third duration of time and each second duration of time occurs immediately before and after a third duration of time.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
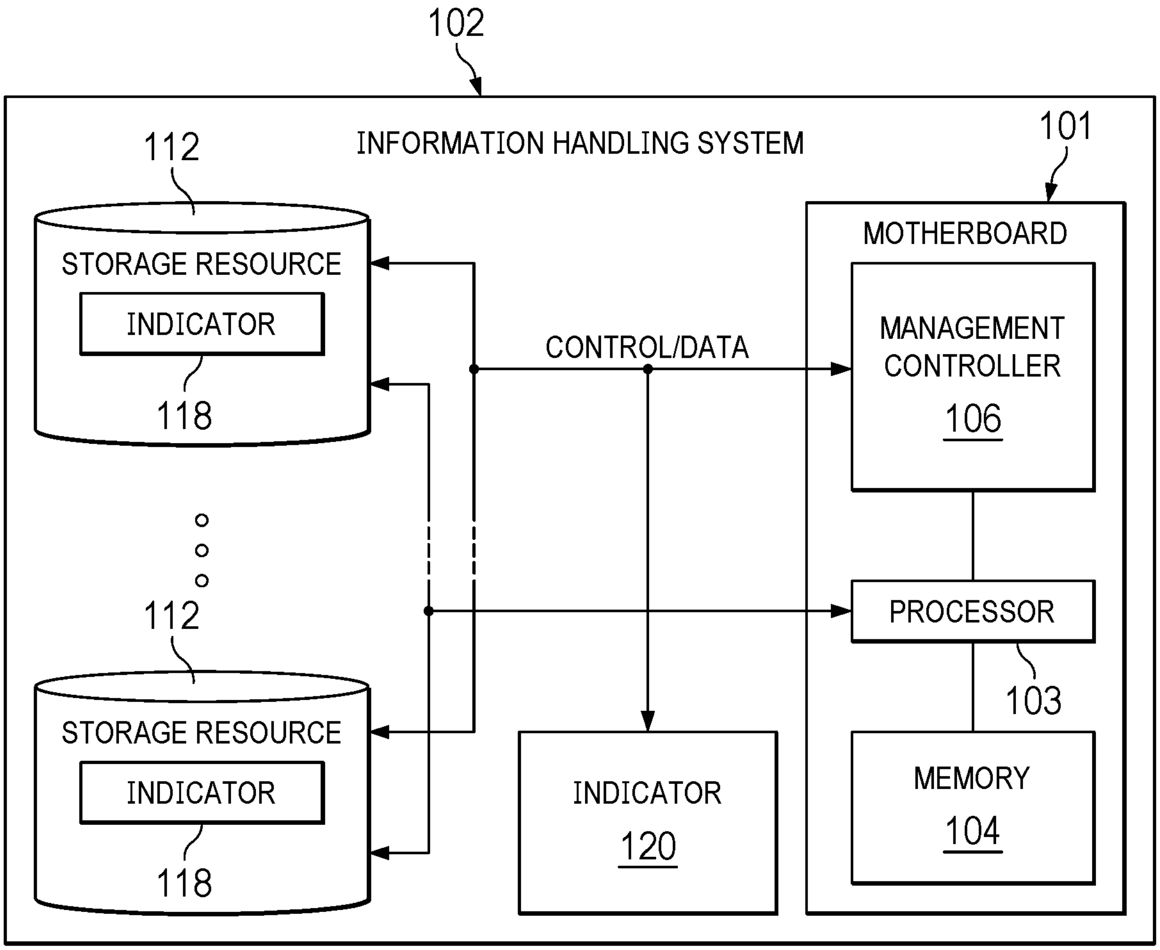
FIG. 1 illustrates a block diagram of an example information handling system, in accordance with embodiments of the present disclosure.

FIG. 1 illustrates a block diagram of an example of an information handling system 102. As depicted, information handling system 102 may include a motherboard 101, a plurality of storage resources 112, a visual indicator 120, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with other information handling resources of information handling system 102 (e.g., storage resources 112, visual indicator 120, etc.) to communicate control and/or telemetry data between management controller 106 and such information handling resources. For example, an information handling resource may communicate information regarding status and/or health of such information handling resource and/or measurements of electrical parameters (e.g., electrical currents or voltages) present in such information handling resource. In these and other embodiments, management controller 106 may issue commands or other messages for controlling/managing information handling resources. In some embodiments, communication between management controller 106 and another information handling resource may be via a systems management interface such as, for example, Inter-Integrated Circuit (i2C), System Management Bus (SMBus) or Power Management Bus (PMBus).

A storage resource 112 may be communicatively coupled to processor 103 and/or management controller 106 and may include any system, device, or apparatus operable to store information processed by processor 103. Storage resource 112 may include, for example, one or more direct access storage devices (e.g., hard disk drives), and/or one or more sequential access storage devices (e.g., tape drives).

As shown in FIG. 1, each storage resource 112 may include a visual indicator 118. Each visual indicator 118 may include any device, system, or apparatus for providing a human-perceptible visual indication to a user of a condition related to the storage resource 112 in which it is integrated or otherwise associated. In some embodiments, a visual indicator 118 may comprise a light-emitting diode (LED). Although visual indicators 118 are shown as integral to storage resources 112, in some embodiments a visual indicator 118 may be separate from its associated storage resource 112.

Figure 2:
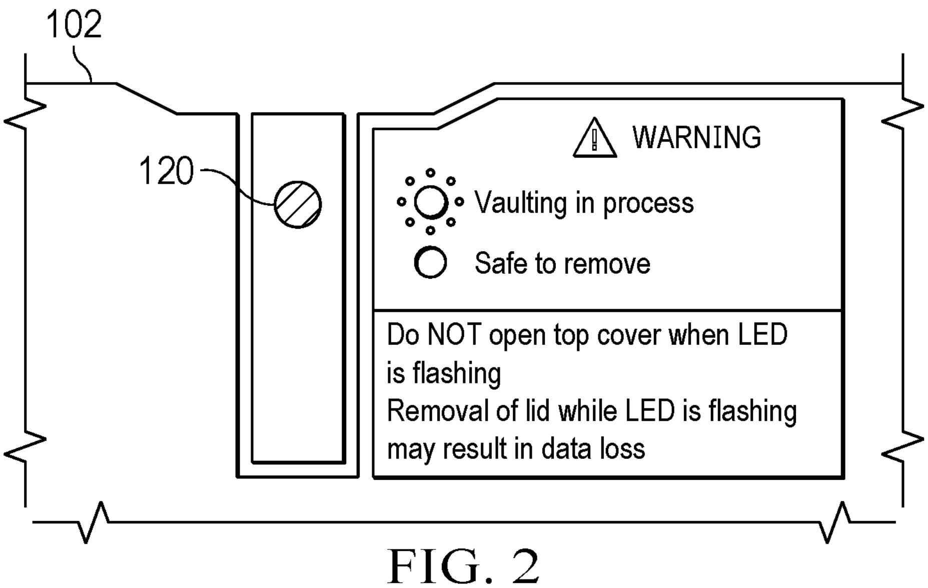
FIG. 2 illustrates detail of an example system-level visual indicator that may be visible from an exterior of an information handling system, in accordance with embodiments of the present disclosure.

While visual indicators 118 may be device-level indicators that communicate a condition relating to an associated storage resource 112, visual indicator 120 may comprise a system-level human-perceptible visual indication to a user of a condition related to information handling system 102. For example, in some embodiments, visual indicator 120 may communicate to a user a condition occurring within information handling system 102 (e.g., vaulting of data from memory 104 to storage resource(s) 112 as shown in FIG. 2), while a device-level visual indicator 118 may communicate to a user a condition relating to an associated storage resource 112 (e.g., data vaulting operation is vaulting data from memory 104 to the storage resource 112 associated with the visual indicator 118 illuminated with a particular pattern).

In addition to motherboard 101, processor 103, memory 104, management controller 106, storage resources 112, visual indicators 118, and visual indicator 120, information handling system 102 may include one or more other information handling resources.

Figure 3:
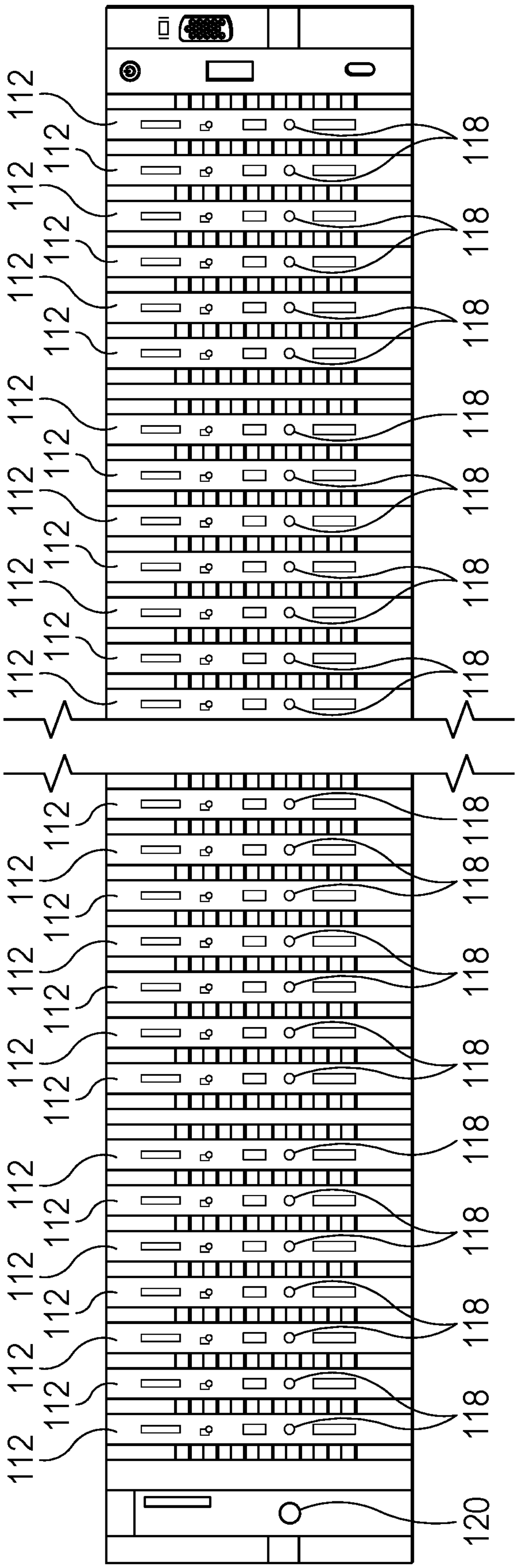
FIG. 3 illustrates selected components of a side of an information handling system as may be visible from the exterior of the information handling system, in accordance with embodiments of the present disclosure.

FIG. 3 illustrates selected components of a side of information handling system 102 as may be visible from the exterior of information handling system 102, in accordance with embodiments of the present disclosure. FIG. 3 thus illustrates an example arrangement of storage resources 112, visual indicators 118, and indicator 120 as seen by a user/technician of information handling system 102, wherein storage resources 112 are accessible to the exterior of information handling system 102, to allow easy insertion or removal of storage resources 112, and wherein visual indicators 118 and indicator 120 may communicate to such user/technician visual indications of conditions relating to storage resources 112 and/or information handling system 102.

In order to communicate an indication of a particular critical condition associated with a storage resource 112 (e.g., vaulting operation, read operation, write operation, or other operation for which removal of the storage resources 112 may lead to data loss), management controller 106 may communicate one or more control signals to the storage resource 112 in order to cause the visual indicator 118 of the storage resource 112 to illuminate with a periodic blink pattern for which a human may quickly and easily register such indication and discern such indication from the visual noise caused by illumination of other visual indicators within the human's field of vision.

For example, such blink pattern may include a periodic pattern which includes one or more first durations of time in which visual indicator 118 may be illuminated (e.g., "ON"), one or more second durations of time significantly shorter than the first durations of time in which visual indicator 118 may be illuminated, with first durations of time and second durations of time occurring in any suitable order (e.g., first and second durations may alternate, multiple first durations may occur between successive occurrences of second durations, multiple second durations may occur between successive occurrences of first durations, etc.), and with each first duration of time and each second duration of time occurring immediately before and after third durations of time in which visual indicator 118 may be darkened (e.g., "OFF"), wherein each third duration of time is substantially shorter than each first duration of time and each second duration of time (e.g., each first duration of time>>each second duration of time>>each third duration of time). As used herein, a duration of time "x" being "substantially shorter" than a duration of time "y" indicates that such duration of time x is at least three times shorter in duration than duration of time y.

In addition, while a first duration in time may vary in length from another first duration in time, a second duration in time may vary in length from another second duration in time, and a third duration in time may vary in length from another third duration in time, in general each first duration of time may be substantially equal, each second duration of time may be substantially equal, and each third duration of time may be substantially equal. As used herein, "substantially equal" may mean a variance of less than 10%.

Figure 4:
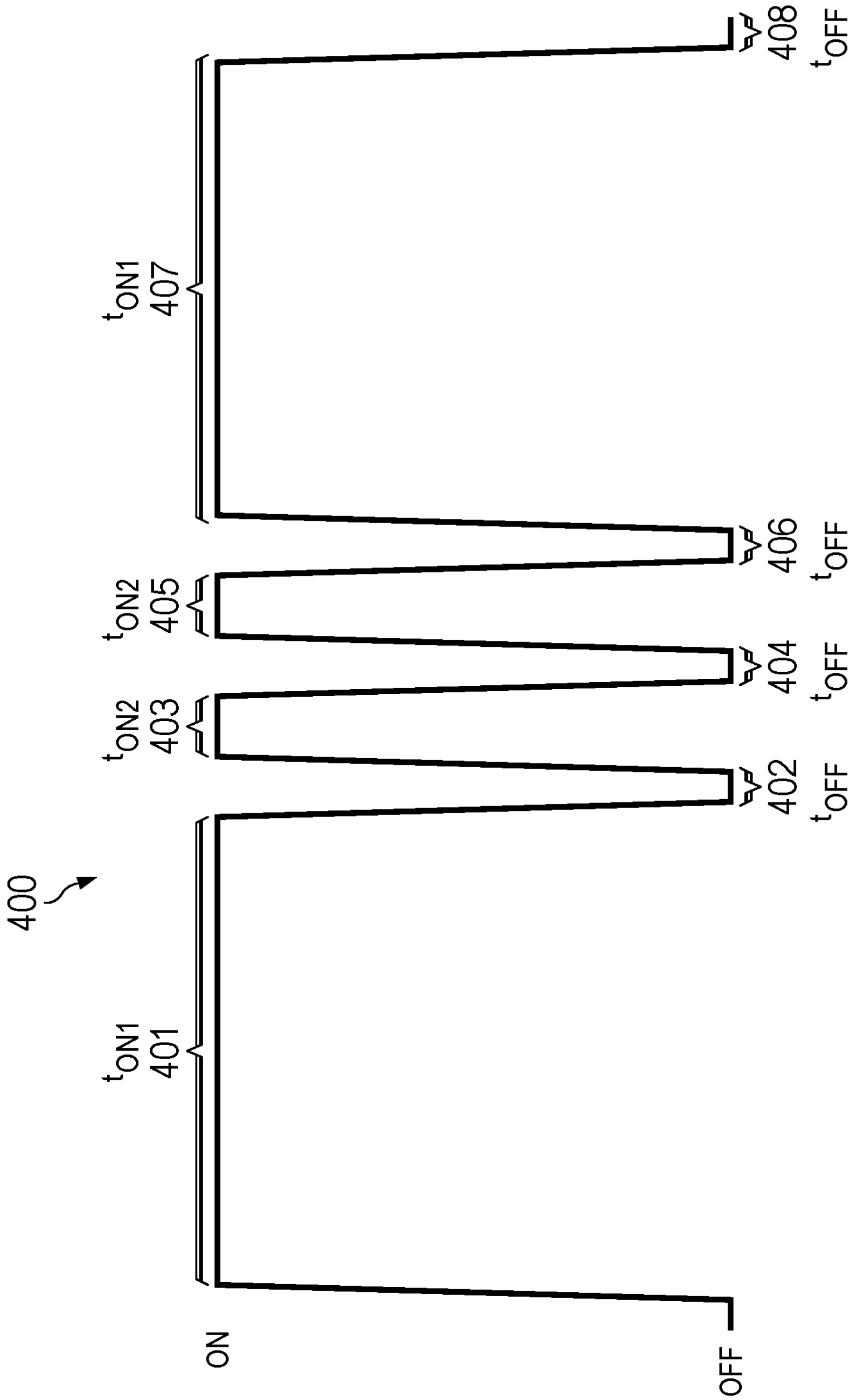
FIG. 4 illustrates a timing diagram of an example blink pattern of a visual indicator, in accordance with embodiments of the present disclosure.

A particular example of blink pattern 400 may be depicted by the timing diagram of FIG. 4. Such blink pattern 400 may include, in order:

- a first interval 401 (e.g., a "first duration of time" in the foregoing paragraph) in which the visual indicator 118 may be illuminated (e.g., "ON") for a first on time $t_{ON1}$;

- a second interval 402 (e.g., a "third duration of time" in the foregoing paragraph) in which the visual indicator 118 may be darkened (e.g., "OFF") for off time $t_{OFF}$ significantly shorter than first on time $t_{ON1}$;
- a third interval 403 (e.g., a "second duration of time" in the foregoing paragraph) in which the visual indicator 118 may be illuminated for a second on time $t_{ON2}$ significantly shorter than first on time $t_{ON1}$ but significantly longer than off time $t_{OFF}$;
- a fourth interval 404 (e.g., another "third duration of time" in the foregoing paragraph) in which the visual indicator 118 may be darkened for off time $t_{OFF}$;
- a fifth interval 405 (e.g., another "second duration of time" in the foregoing paragraph) in which the visual indicator 118 may be illuminated for second on time $t_{ON2}$;
- a sixth interval 406 (e.g., another "third duration of time" in the foregoing paragraph) in which the visual indicator 118 may be darkened for off time $t_{OFF}$;
- a seventh interval 407 (e.g., another "first duration of time" in the foregoing paragraph) in which the visual indicator 118 may be illuminated for first on time $t_{ON1}$;
- an eighth interval 408 (e.g., another "third duration of time" in the foregoing paragraph) in which the visual indicator 118 may be darkened for off time $t_{OFF}$; and
- repeat again from first interval 401.

Example durations for first on time $t_{ON1}$, second on time $t_{ON2}$, and off time $t_{OFF}$, are 3 seconds, 0.5 seconds, and 0.1 seconds accordingly.

While visual indicator 118 may illuminate such blink pattern in any suitable color, in some embodiments, such blink pattern may be in white, to further offset the indication of the critical condition from red, green, blue, and/or amber indicators that may also be within a user's field of vision in a data center.

A study conducted by the Applicant using information technology professionals as test subjects validated that use of a blink pattern similar to that described above may lead to faster recognition of the blink pattern as compared to other types of blink patterns and visual stimulus. Thus, by using a visual mask relatively short in duration (e.g., off time $t_{OFF}$) in which visual indicator 118 is darkened, intervals of illumination (e.g., intervals 401, 403, 405, 407) may be more effectively registered by a human visual cortex due to a neurochemical reaction triggered by the visual mask. The human visual cortex in the occipital lobe of the brain may more readily register a blink pattern if there exists a lack of "change blindness" and a very short (e.g., less than approximately 100 milliseconds) visual mask. Accordingly, blink pattern 400, blink patterns described herein, and other blink patterns similar thereto may in effect "pre-load" or "prime" a human visual cortex with instant registration of a new, different stimulus.

Using blink pattern 400 or other blink patterns similar thereto may enable a user or technician to quickly recognize and learn such a blink pattern to indicate a particular condition (e.g., caching or vaulting operation taking place) without raising alarm but heightening awareness in a sea of blinking LEDs that may occur on information handling system 102.

The use of blink pattern 400 or other blink patterns similar thereto, and in particular the use of a visual mask (e.g., darkened or off periods within the blink pattern) may psycho-visually imprint a desired light stimulus (e.g., photochemical reaction) onto a user's brain through a neurochemical response. In the present disclosure, visual masking may be deployed by reducing the visibility of one very brief blink (e.g., <approximately 100 milliseconds) by presenting a second blink, thus leveraging visual masking as a tool to cognitively register a blink pattern faster than traditional human visual processing times.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a processor;

a plurality of devices communicatively coupled to the processor;

a plurality of visual indicators, each visual indicator associated with a respective device of the plurality of devices; and a management controller communicatively coupled to the plurality of visual indicators and configured to, in response to a condition related to a particular device of the plurality of devices, cause a particular visual indicator associated with the particular device to illuminate in accordance with a blink pattern, the blink pattern comprising:

one or more first durations of time in which the particular visual indicator is illuminated;

one or more second durations of time significantly shorter than the first durations of time in which the particular visual indicator is illuminated; and a plurality of third durations of time, wherein each third durations of time is significantly shorter than the first durations of time and the second durations of time in which the particular visual indicator is darkened, wherein each first duration of time occurs immediately before and after a third duration of time and each second duration of time occurs immediately before and after a third duration of time, and wherein successive multiple second durations of time occur between successive occurrences of first durations of time.

2. The information handling system of claim 1, wherein:

each first duration of time is substantially equal in length;

each second duration of time is substantially equal in length; and each third duration of time is substantially equal in length.

3. The information handling system of claim 1, wherein multiple first durations of time occur between successive occurrences of second durations of time.

4. The information handling system of claim 1, wherein each of the plurality of visual indicators comprises a light-emitting diode.

5. The information handling system of claim 1, wherein each of the plurality of devices comprises a storage resource.

6. The information handling system of claim 1, wherein the condition comprises an occurrence of an operation that could lead to data loss if the particular device is removed from the information handling system.

7. The information handling system of claim 1, further comprising a system-level visual indicator and wherein the management controller is further configured to cause the system-level visual indicator to illuminate in response to the condition.

8. The information handling system of claim 1, wherein each third duration of time is less than approximately 100 milliseconds.

9. A method comprising, in response to a condition related to a particular device of a plurality of devices in an information handling system, causing a particular visual indicator associated with the particular device to illuminate in accordance with a blink pattern, the blink pattern comprising:

one or more first durations of time in which the particular visual indicator is illuminated;

one or more second durations of time significantly shorter than the first durations of time in which the particular visual indicator is illuminated; and a plurality of third durations of time, wherein each third durations of time is significantly shorter than the first durations of time and the second durations of time in which the particular visual indicator is darkened, wherein each first duration of time occurs immediately before and after a third duration of time and each second duration of time occurs immediately before and after a third duration of time, and wherein successive multiple second durations of time occur between successive occurrences of first durations of time.

10. The method of claim 9, wherein:

each first duration of time is substantially equal in length;

each second duration of time is substantially equal in length; and each third duration of time is substantially equal in length.

11. The method of claim 9, wherein multiple first durations of time occur between successive occurrences of second durations of time.

12. The method of claim 9, wherein each of the plurality of visual indicators comprises a light-emitting diode.

13. The method of claim 9, wherein each of the plurality of devices comprises a storage resource.

14. The method of claim 9, wherein the condition comprises an occurrence of an operation that could lead to data loss if the particular device is removed from the information handling system.

15. The method of claim 9, further comprising causing a system-level visual indicator to illuminate in response to the condition.

16. The method of claim 9, wherein each third duration of time is less than approximately 100 milliseconds.

17. An article of manufacture comprising:

a non-transitory computer-readable medium; and computer-executable instructions carried on the computer-readable medium, the instructions readable by a processor, the instructions, when read and executed, for causing the processor to, in response to a condition related to a particular device of a plurality of devices in an information handling system, cause a particular visual indicator associated with the particular device to illuminate in accordance with a blink pattern, the blink pattern comprising:

one or more first durations of time in which the particular visual indicator is illuminated;

one or more second durations of time significantly shorter than the first durations of time in which the particular visual indicator is illuminated; and a plurality of third durations of time, wherein each third durations of time is significantly shorter than the first durations of time and the second durations of time in which the particular visual indicator is darkened, wherein each first duration of time occurs immediately before and after a third duration of time and each second duration of time occurs immediately before and after a third duration of time, and wherein successive multiple second durations of time occur between successive occurrences of first durations of time.

18. The article of claim 17, wherein:

each first duration of time is substantially equal in length;

each second duration of time is substantially equal in length; and each third duration of time is substantially equal in length.

19. The article of claim 17, wherein multiple first durations of time occur between successive occurrences of second durations of time.

20. The article of claim 17, wherein each of the plurality of visual indicators comprises a light-emitting diode.

21. The article of claim 17, wherein each of the plurality of devices comprises a storage resource.

22. The article of claim 17, wherein the condition comprises an occurrence of an operation that could lead to data loss if the particular device is removed from the information handling system.

23. The article of claim 17, the instructions for further causing the processor to cause the system-level visual indicator to illuminate in response to the condition.

24. The article of claim 17, wherein each third duration of time is less than approximately 100 milliseconds.

* * * * *